US007149970B1

(12) United States Patent
Pratley et al.

(10) Patent No.: US 7,149,970 B1
(45) Date of Patent: Dec. 12, 2006

(54) METHOD AND SYSTEM FOR FILTERING AND SELECTING FROM A CANDIDATE LIST GENERATED BY A STOCHASTIC INPUT METHOD

(75) Inventors: Chris Pratley, Seattle, WA (US); Jeff Reynar, Woodinville, WA (US); Chiaki Tanaka, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 09/602,306

(22) Filed: Jun. 23, 2000

(51) Int. Cl.
*G06F 17/21* (2006.01)
*G10L 15/00* (2006.01)
*G06F 17/00* (2006.01)

(52) U.S. Cl. .................. 715/533; 715/531; 715/532; 704/251; 704/231; 704/10

(58) Field of Classification Search ............. 715/533, 715/541, 540, 531, 532; 704/270, 231, 251, 704/9, 10
See application file for complete search history.

(56) References Cited

U.S. PATENT DOCUMENTS

| 5,576,955 | A | * | 11/1996 | Newbold et al. ........... 715/533 |
| 5,604,897 | A | * | 2/1997 | Travis ....................... 715/533 |
| 5,659,771 | A | * | 8/1997 | Golding ..................... 715/533 |
| 5,712,957 | A | * | 1/1998 | Waibel et al. .............. 704/240 |
| 5,761,687 | A | * | 6/1998 | Hon et al. .................. 715/531 |
| 5,794,189 | A | * | 8/1998 | Gould ........................ 704/231 |
| 5,845,300 | A |   | 12/1998 | Comer et al. ............... 707/508 |
| 5,855,000 | A | * | 12/1998 | Waibel et al. .............. 704/235 |
| 5,896,321 | A | * | 4/1999 | Miller et al. ............ 365/189.01 |
| 5,909,667 | A | * | 6/1999 | Leontiades et al. ......... 704/275 |
| 5,956,739 | A | * | 9/1999 | Golding et al. ............. 715/533 |
| 6,131,102 | A | * | 10/2000 | Potter ......................... 715/533 |
| 6,182,028 | B1 | * | 1/2001 | Karaali et al. ................. 704/9 |
| 6,377,965 | B1 | * | 4/2002 | Hachamovitch et al. .... 715/534 |
| 6,424,983 | B1 | * | 7/2002 | Schabes et al. ............. 715/533 |
| 6,438,523 | B1 | * | 8/2002 | Oberteuffer et al. ........ 704/270 |
| 6,490,549 | B1 | * | 12/2002 | Ulicny et al. ................. 704/10 |
| 6,618,697 | B1 | * | 9/2003 | Kantrowitz et al. .......... 703/22 |
| 2003/0036900 | A1 | * | 2/2003 | Weise ............................. 704/9 |
| 2003/0037077 | A1 | * | 2/2003 | Brill et al. ................... 707/533 |
| 2005/0091054 | A1 | * | 4/2005 | Thrasher et al. ............ 704/254 |
| 2005/0210383 | A1 | * | 9/2005 | Cucerzan et al. ........... 715/533 |

OTHER PUBLICATIONS

Microsoft Word 2000, ScreenShot pp. 1-5, Dec. 31, 1999.*

* cited by examiner

*Primary Examiner*—Stephen Hong
*Assistant Examiner*—Adam L. Basehoar
(74) *Attorney, Agent, or Firm*—Merchant & Gould

(57) ABSTRACT

A computer-implemented method and system for correcting text input from a stochastic input source is provided. After a text component such as a word or phrase is identified as erroneous where, for example, the stochastic input source translated the input incorrectly, a list of alternatives to the erroneous text component is provided to the user via a user interface that pops up directly into the document being prepared. The user begins editing the erroneous text component by typing directly into the document or by spelling aloud, in the case of a speech recognition device. As the user begins editing, the list of alternatives is filtered to provide only alternatives that may match the user's editing. With each additional character or letter entered by the user during editing, the list is further filtered. A suggested completion for the user's editing may be provided to the user by displaying the suggestion directly in the document.

28 Claims, 5 Drawing Sheets

METHOD AND SYSTEM FOR FILTERING AND SELECTING FROM A CANDIDATE LIST GENERATED BY A STOCHASTIC INPUT METHOD

FIELD OF THE INVENTION

The invention relates generally to methods and systems for entering text into a computer and, more particularly, relates to correcting text input from stochastic input methods and systems such as speech dictation and handwriting in alphabetic languages.

BACKGROUND OF THE INVENTION

Computer users have traditionally entered text into word processors through a keyboard and mouse. In recent years, however, word processors have become more sophisticated by allowing users to enter text into them through other input methods, such as speech or handwriting. Although a computer cannot always interpret such input with complete accuracy, a computer can generate a list of text alternatives for the input. Furthermore, the computer can often assign to each alternative a probability that the alternative is the one the user intended. Input that produces such probabilistic results is called "stochastic input," while input that can be accurately determined, such as typed text, is called "non-stochastic input."

Typically, text produced in a word processor from stochastic input must be heavily edited by the user in order to produce the text intended by the user when he or she created the stochastic input. The editing process has been simplified by allowing the user to select text created from stochastic data and request alternatives for the text selection. Stochastic input methods are generally capable of providing alternatives besides their initial guess for a given input. In response, the computer can provide the user with alternatives for the text selection through a graphical user interface. If the user chooses one of the alternatives, the computer replaces the text selection with the selected alternative. For example, if the user of a dictation system dictates the word "teach", the system might recognize this word as "beach". However, through a user initiated action, the speech recognition system may display other alternatives for the user's dictation—hopefully including the word the user actually dictated, namely "teach".

A problem with such systems is that the stochastic input methods often generate so many additional candidates that the user is unlikely to be willing to read through them all. As a result, it is important that the user be able to filter the list in order to more easily determine whether the list contains the word desired by the user. Prior systems, such as those often associated with spell checking programs, allow users to browse a candidate list of alternative words by entering a graphical user interface and scrolling through the candidate list. If the user finds the desired word on the list, the user may select the desired word and then close the user interface.

Some systems provide the user via the user interface a search capability where the user may type characters comprising the word the user wanted in order to determine whether the word is present on the list or whether the word is in the dictionary of words available to the user's system. However, users often are unlikely to make the investment of typing into the user interface if their typing will be lost if the word they are looking for is not on the alternative list.

Accordingly, there is a need in the art for a method and system for allowing users to filter a candidate list of alternative replacement words by typing directly into the document rather than reading the entire list in search of the desired word.

There is also a need for a method and system for allowing the user to keep the text the user has typed or dictated to filter the list where no matching word is found on the candidate list rather than require the user to close the user interface and retype or dictate the word into the document after determining the desired word is not on the list.

There is further a need for providing the user a tip as to the best candidate on the list that matches the characters the user has typed in order to filter the candidate list.

There is still a further need in the art for a method and system for allowing the user to select a word from the candidate list or accept a tip as to the best word on the candidate list and have that word inserted directly into the document being edited by the user without requiring the user to close the user interface before continuing to input text into the document.

SUMMARY OF THE INVENTION

The present invention meets the needs described above in a method and system for correcting text input from a stochastic input source. After a text component such as a word or phrase is identified as erroneous where, for example, the stochastic input source translated the input incorrectly, a list of alternatives to the erroneous text component is provided to the user via a user interface that pops up directly into the document being prepared. The user begins editing the erroneous text component by typing directly into the document or by spelling aloud, in the case of a speech recognition device. As the user begins editing, the list of alternatives is filtered to provide only alternatives that may match the user's editing. With each additional character or letter entered by the user during editing, the list is further filtered. A suggested completion for the user's editing may be provided to the user by displaying the suggestion directly in the document. If the user accepts the suggestion or tip, the suggestion is entered into the document in place of the erroneous text, and the user interface is closed. If no acceptable word or phrase is displayed during filtering of the list, the characters input by the user during editing are accepted as a replacement for the erroneous text and the user interface closes. Accordingly, the edited text entered by the user is not lost if the word or phrase desired by the user is not on the list of alternatives.

More particularly stated, the present invention provides a method and system for correcting text input into a text document. A text selection input into the text document is received, and the text selection comprises one or more text components. An erroneous text component is identified from the text component, and the erroneous text component is selected for editing. After receiving a command to display a list of alternatives to the erroneous text component, a list of alternatives is displayed via a user interface opened directly into the text document. A user of the method begins editing the erroneous text component directly in the erroneous text component, and the editing comprises a partial entry of a desired alternative to the erroneous text component.

Preferably, the step of receiving a text selection input into the text document includes receiving the text selection from a stochastic input source, such as a speech recognition device or hand writing recognition device. The step of receiving edits to the erroneous text component preferably includes typing a first character of the selected alternative directly into the text document at the location of the erroneous text component. The step of receiving an edit to the erroneous text component may include audibly spelling, via a speech recognition device, a first character of the selected alternative directly into the text document at the location of the erroneous text component. Alternatively, the step of receiving an edit to the erroneous text component may include hand writing, via a hand writing recognition device, a first character of the selected alternative directly into the text document at the location of the erroneous text component. Other input methods may be utilized such as vision-based input devices for recognizing sign language or other physical gestures. Non-stochastic input methods such as keyboard entry may also be used.

The list of alternatives is filtered in response to editing to remove alternatives not associated with the partial entry. In response to filtering the list of alternatives, a revised list of alternatives is displayed containing alternatives associated with the partial entry. An alternative to the erroneous text component from the revised list is selected, and the erroneous text component is replaced directly in the text document with the selected alternative. After replacement of the erroneous text, the user interface is closed.

If, in response to filtering the list of alternatives no acceptable alternative to the erroneous text component is identified, additional editing by the user may be performed to further filter the list of alternatives in response to the additional edits. If no acceptable alternative to the erroneous text component is identified in response to further filtering of the list of alternatives in response to the additional edits, the erroneous text component is replaced with the entry comprised of the edit and the additional edits.

During the editing process, a matching completed alternative text component may be identified within the revised list of alternatives containing alternatives associated with the partial entry. If a matching completed alternative text component is identified, it may be displayed directly in the text document as a suggested completion for the partial entry. If the suggested completion is acceptable to the user, an acceptance command is issued in association with the suggested completion. In response to the acceptance command, the erroneous text component is replaced directly in the text document with the matching completed alternative text component, and the user interface is closed.

The various aspects of the present invention may be more clearly understood and appreciated from a review of the following detailed description of the disclosed embodiments and by reference to the appended drawings and claims.

DETAILED DESCRIPTION OF THE EXEMPLARY EMBODIMENTS

Figure 1:
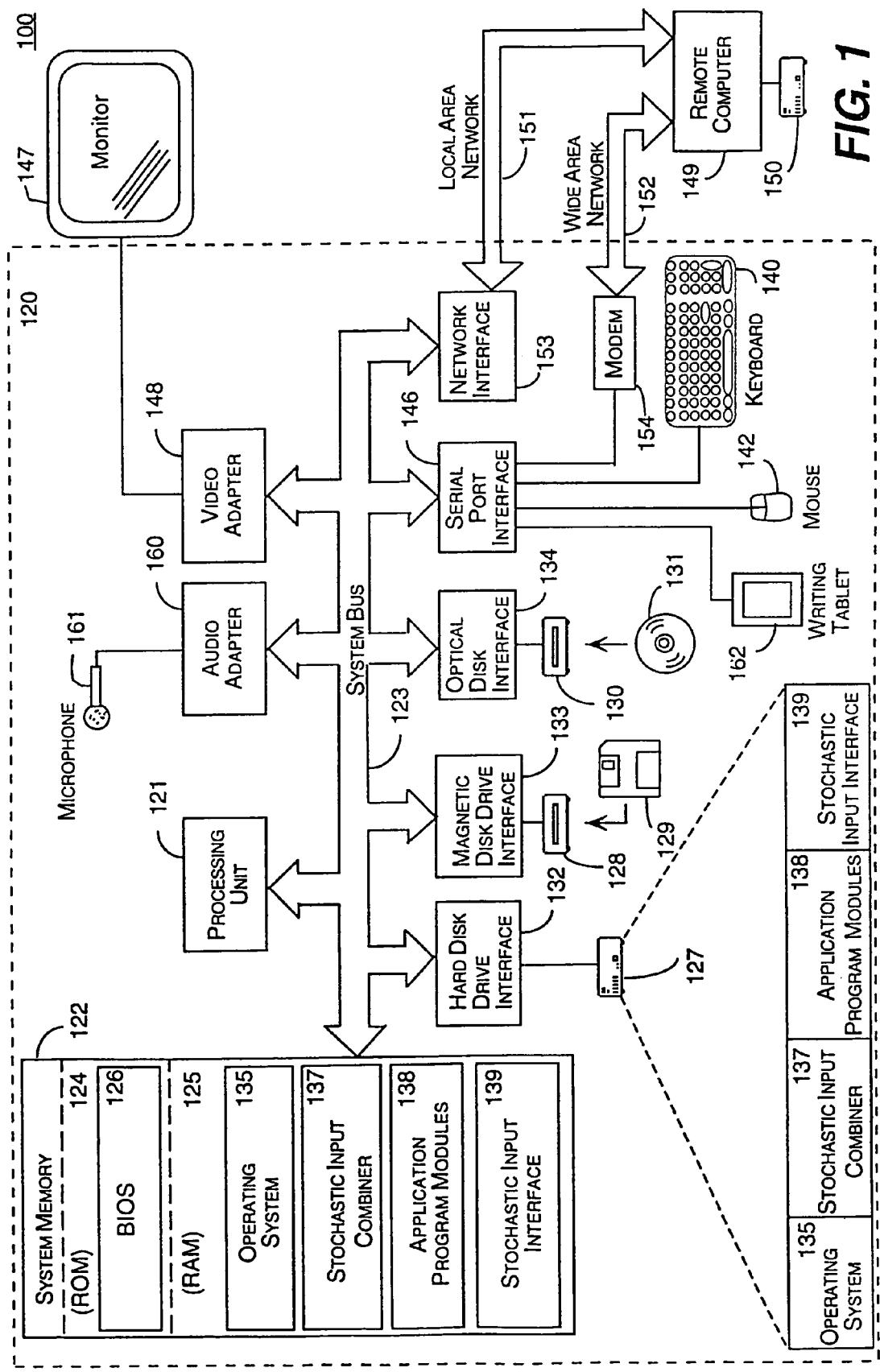
FIG. 1 is a block diagram illustrating the operating environment for an exemplary embodiment of the present invention.

In accordance with an exemplary embodiment of the present invention, text and data input using a conventional word processing or data input computer program may be edited by the user of those programs. After the user inputs text or data using a stochastic input method or system, and the user determines a word or data has been displayed by the program incorrectly, the user selects that word or data and then selects a correction button or function key or the like. It should be understood that the embodiments of the present invention may be used equally well to correct input from nonstochastic input methods such as typing. Upon selection of the correction function, a user interface opens directly into the document being edited and presents to the user a list of candidate alternative words or data from which the user may select a corrected word or data.

Rather than enter the user interface to browse through the candidate list of words or data, the user locates the cursor at the incorrect word or data and begins to type or spell out, in the case of speech dictation units, the letters or characters comprising the correct word or data. As discussed above, other methods of input may include handwriting methods for handwritten input, and vision-based methods for recognizing sign language or other gestures. As the user begins entering characters, the list of candidate words or data in the user interface is dynamically filtered to present to the user candidates that may match the characters being input by the user. As soon as the user identifies the correct word or data on the candidate list, the user may select the word or data, and that word or data will be inserted directly into the document, and the user interface will close.

The user then may proceed to continue inputting words or data. If the user types or dictates all the characters of the desired word or data, and the correct word or data is never located on the candidate list in the opened user interface, the word or data being input by the user is accepted and the user interface closes without action by the user. In accordance with the preferred embodiment of the present invention, the user is assisted in the editing process by autocomplete tip functionality. That is, as the user begins entering characters directly into the document to correct the incorrect word or data and to filter the candidate list, the autocomplete tip functionality will present to the user directly in the document being edited words or data that are suggested matches for the word or data desired by the user. If the word or data suggested by the autocomplete tip functionality is the word or data desired by the user, the user may accept the autocomplete tip and that word or data will be entered into the document, and the user interface will close. Advantageously, the present invention allows the user to commence editing incorrectly entered words or data directly into the document without the need for physically placing the cursor inside the opened user interface and browsing for the desired corrective word or data.

The present invention is typically embodied in a word processor that can receive input from multiple sources, each of which can be a non-stochastic input source or a stochastic input source. Keyboard/mouse entry of text is an example of an input source which is non-stochastic, meaning that the computer can determine the text the user intended with complete accuracy. On the other hand, a stochastic input source is one that converts input into a stochastic result. A stochastic result is one having multiple alternatives, each having less than 100% probability of being the correct alternative. An example of a stochastic input source is a speech recognition unit, which converts speech input into a list of text alternatives since a computer cannot always interpret speech with complete accuracy. Other examples of a stochastic input source are a handwriting recognition unit and an input method editor (IME).

A program module called a stochastic input combiner is typically responsible for producing the alternatives for a text selection entered by a stochastic input method. The stochastic input combiner does this by parsing the text selection into smaller text components derived from no more than one stochastic input source. For each stochastic text component, the stochastic input combiner then retrieves a stochastic model representing the alternatives for the text component. Then, the stochastic input combiner can combine the stochastic models retrieved with other text components to produce a list of alternatives for the text selection as a whole.

The stochastic input combiner can be part of the word processing application. Alternatively, the stochastic input combiner can be a separate utility that is part of the operating system. The combiner could also be a separate program that interfaces with the word processor but that is not part of the operating system.

Often, stochastic input sources make an error which spans multiple words. During the correction process, a user may not notice the full extent of that error. For example, if the user dictates the word "recognize," the speech recognition engine might conclude that the most likely interpretation of the speech input is "wreck a nice." While editing, the user might see the word "wreck" and request alternatives only for that word because the user did not notice that the following words were also incorrect (i.e., "a nice").

If a user makes a text selection that does not include adjacent words that are incorrect because of a related error and if the word processor only uses the user's text selection to produce an alternatives list, none of the alternatives offered for the text selection may be the text the user intended at the time of input. Similarly, replacing the text selection with an alternative chosen by the user from the alternatives list would leave the incorrect adjacent words in the text.

To eliminate these disadvantages, the stochastic input combiner may submit the text selection to a correction scope model which determines if the scope of correction should be expanded. In the "recognize" example, an appropriate text unit for correction would be "wreck a nice." To make this determination, the correction scope model may draw on information included in a natural language model, models of likely errors, and models tied to the input methods used to produce the text in the word processor. The models associated with the input methods may include acoustic models for speech recognition, handwriting models for handwritten input, and vision-based models for recognizing sign language or other gestures.

If the correction scope model determines that the scope of correction should be adjusted, the correction scope model identifies one or more larger text units for which the stochastic input combiner should produce alternatives in the manner already described. Typically, adjusting the scope of correction involves identifying a text unit that will provide better text correction alternatives to the user than the text selection alone. For instance, the text selection may not include neighboring words that also contain errors which could be corrected together with the text selection. Usually, such errors in words neighboring a user's text selection are identifiable because they relate to errors in the text selection. Accordingly, a text unit identified by the correction scope model may include the text selection plus one or more adjacent words. Instead of identifying only a single text unit for possible correction, the correction scope model may identify multiple text units, each of which are likely to yield good alternatives for text correction. The correction scope model sends a list of these text units to the stochastic input combiner for processing.

The operation of stochastic input methods and the provision of alternatives for text derived from stochastic input sources is described in greater detail below and in U.S. patent application Ser. No. 09/412,822, filed Oct. 5, 1999 now U.S. Pat. No. 6,789,231, assigned to the same assignee as the present invention which application is hereby incorporated by reference.

Turning now to the figures, in which like numerals refer to like elements throughout the several figures, aspects of the present invention will be described.

Exemplary Operating Environment

FIG. 1 and the following discussion are intended to provide a brief and general description of a suitable computing environment 100 for an implementation of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A user may enter commands and information into the personal computer 120 through conventional input devices, including a keyboard 140 and pointing device, such as a mouse 142. A microphone 161 may be used to enter audio input, such as speech, into the computer system 120. A user may enter graphical information, such as drawings or handwriting, into the computer system by drawing the graphical information on a writing tablet 162 using a stylus. The computer system 120 may include additional input devices (not shown), such as a joystick, game pad, satellite dish, scanner, touch screen/stylus, or the like. The microphone 161 can be connected to the processing unit 121 through an audio adapter 160 that is coupled to the system bus. The other input devices are often connected to the processing unit 121 through a serial port interface 146 that is coupled to the system bus, but may be connected by other interfaces, such as a game port or a universal serial bus (USB).

A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with I/O devices or with other computers. Program modules include routines, operating system 135, application program modules 138, data structures, browsers, and other software or firmware components. The invention may conveniently be implemented in one or more program modules, such as a stochastic input combiner program module 137 and a stochastic input interface program module 139, each of which is based upon the methods described in the detailed description.

Figure 2:
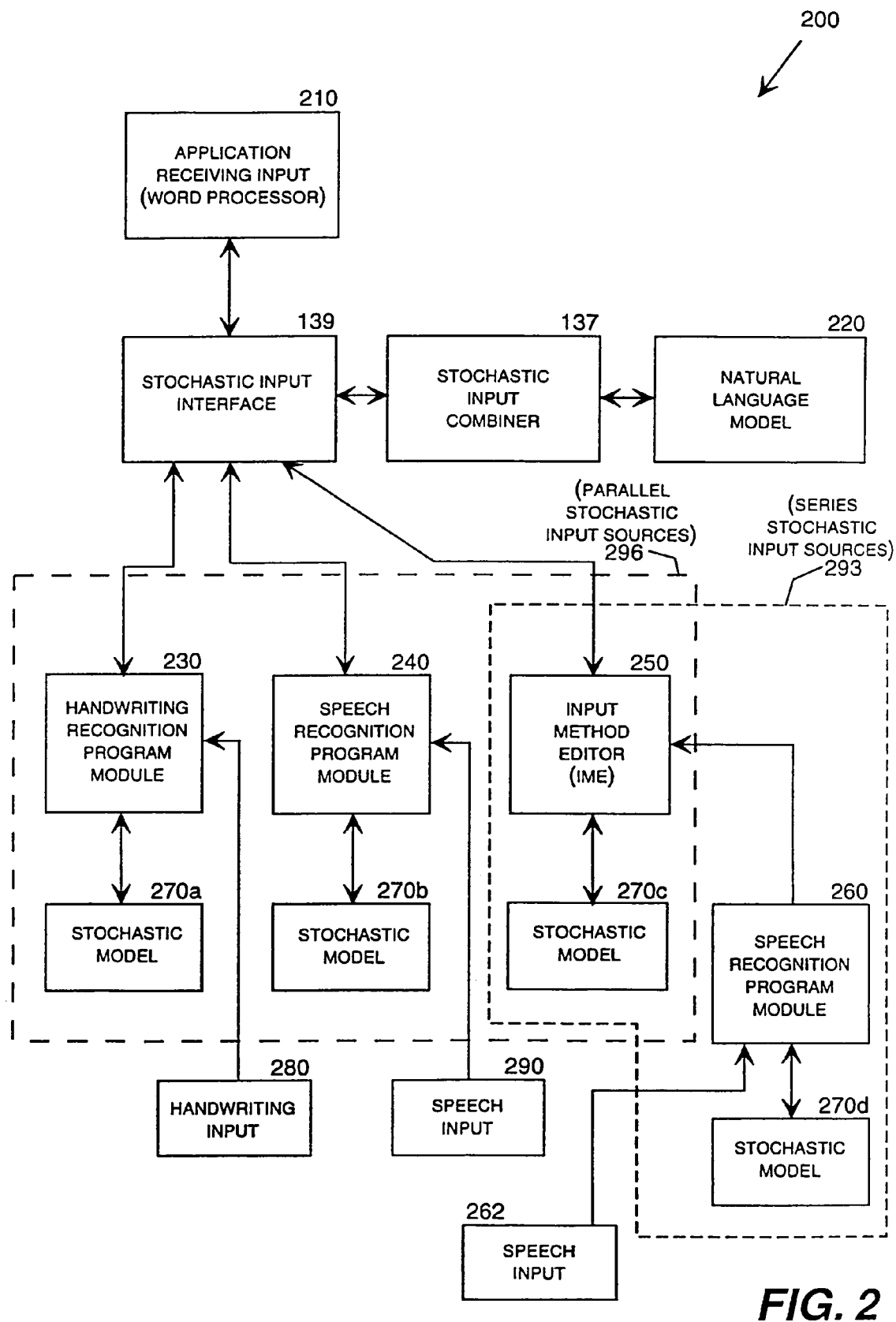
FIG. 2 is a block diagram providing an overview of the program modules of a multi-source data processing system.

The application program modules 138 may comprise a variety of applications used in conjunction with the present invention, some of which are shown in FIG. 2. The purposes of and interactions between some of these program modules are discussed more fully in the text describing FIG. 2. These include a word processor program 210 (such as WORD, produced by Microsoft Corporation of Redmond, Wash.), a handwriting recognition program module 230, a speech recognition program module 240, and an input method editor (IME) 250.

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Overview of Program Modules

FIG. 2 provides an overview of the program modules of a multi-source data processing system 200. Generally, the program modules shown in FIG. 2 enable a user to enter text into an application 210, such as a word processor, using both stochastic and non-stochastic input sources. Typical stochastic input sources include a handwriting recognition program module 230, speech recognition program module 240, input method editor (IME) 250, and speech recognition program module 260. A keyboard 140 is a typical source of non-stochastic data. As described in detail below, once the user enters text into the word processor 210 through one or more of these input sources, the user may then select a section of text and request a candidate list of alternatives for that text selection. The text selection may contain input from multiple stochastic and non-stochastic input sources. As long as the text selection is derived from at least one stochastic input source, there will be alternatives for the text selection. The program modules can produce this candidate list and present them to the user through a graphical user interface. If the user chooses one of the candidates, the text selection is replaced with the chosen candidate. The operation of stochastic input sources 230, 240, 250, and 260 are now discussed in turn.

The handwriting recognition program module 230 receives handwriting input 280 from the user. The user may generate the handwriting input 280 by writing on the writing tablet 162 with a stylus. Alternatively, the user may generate handwriting input 280 using other devices. For instance, the user may write on the monitor 147 with a mouse 142, or the user may write on a touch screen using a stylus. After input, the handwriting input 280 is preferably directed to the handwriting recognition program module 230 by a writing tablet driver module in the operating system 135.

As handwriting is often difficult for a computer to interpret, the handwriting recognition program module 230 cannot always decipher the handwriting input 280 with complete accuracy. The best the program module 230 can do is to generate alternatives for the handwriting input 280 and assign a probability that each alternative is the correct one. By definition, then, the handwriting recognition program module 230 generates a stochastic result. The stochastic model 270a includes a data structure containing the stochastic data produced by processing handwriting input 280 with the handwriting recognition program module 230.

Although any data structure capable of storing stochastic data can comprise a stochastic model 270, two useful structures for doing so are a lattice and an "n-best" alternatives list. A lattice is a structure that is well known to those skilled in the art, so a complete description will not be given. Briefly, however, a lattice stores words or phrases produced by a stochastic input source in nodes. Because each word or phrase is stochastic data, the node also stores a probability assigned to the associated word or phrase. Using methods well known to those skilled in the art, the lattice can be traversed in order to produce likely alternatives for any section of text represented by the stochastic data. Furthermore, lattices representing adjacent pieces of text can be combined into a metalattice through a process known as concatenation. The metalattice can then be traversed to produce alternatives for the adjacent pieces of text.

Alternatively, stochastic data may be represented by a list of the n-best alternatives and their associated probabilities. For any given word or phrase, an n-best alternatives list may be produced from a lattice representing the word or phrase.

The speech recognition program module 240 works like the handwriting recognition program module 230, except that it receives speech input 290 from the user through a microphone 161 run by a microphone driver module in the operating system 135. Speech is often difficult to interpret because many words that sound alike have different meanings and spellings, so the speech recognition program module 240 also produces a stochastic result. The stochastic model 270b stores the data structure containing the stochastic data produced by processing speech input 290 with the speech recognition program module 240.

An input method editor (IME) 250 also generates stochastic data. Generally, an IME 250 converts input into foreign language text. The input into an IME 250 may, for example, be typed text entered into the computer through a keyboard 140 and mouse 142. The stochastic model 270c includes a data structure containing the stochastic data produced by the IME 250.

An IME 250 is especially useful for creating ideograms in Asian and other languages. Because there are many more ideograms in such languages than there are keys on a keyboard, entering a particular ideogram into the computer is problematic without an IME 250. In a typical IME 250, a user types in English characters a phonetic spelling for a desired Chinese character. Since many Chinese characters have similar pronunciations, the typed phonetic spellings may represent any one of a number of different Chinese characters, and the IME 250 produces a stochastic result. The IME 250 then provides the user with the most probable candidates intended by the typed phonetic spelling so that the user can choose the correct one.

The stochastic results produced by one stochastic input source may serve as stochastic input to a second stochastic input source. When this is the case, the stochastic input sources are "series stochastic input sources," and the stochastic input sources can be described as configured "in series." This is illustrated by the configuration 293 of program modules, which also demonstrates another embodiment of an IME 250.

A stochastic input interface 139 serves as a conduit for stochastic data between an application 210 that is to receive stochastic data and a stochastic input source, such as handwriting recognition program module 230, speech recognition program module 240, or IME 250. One advantage of having a stochastic input interface 139 as a conduit for stochastic data is that it simplifies communication between the application 210 receiving the stochastic data and the stochastic input sources. That is, the application only needs to know how to communicate with the stochastic input interface instead of all possible stochastic input sources. The application 210 that is to receive stochastic input is a word processor in an exemplary embodiment of the present invention. However, the application 210 could also be a spreadsheet, browser, electronic mail program, music transcription program, CAD program, presentation software (such as PowerPoint, produced by Microsoft Corporation of Redmond, Wash.), operating system, or other software program.

In the word processor embodiment, the word processor 210 receives, though stochastic input interface 139, text representing the most likely alternative from each stochastic input source used to enter data into the word processor. In addition to transmitting data into the word processor 210 through multiple stochastic input sources, the user may also enter typical non-stochastic data into the word processor, such as by typing on a keyboard 140. The word processor 210 combines all this source data into a multi-source text string that is presented to the user. Although the word processor 210 does not indicate to the user the source of each word of the text, the word processor nonetheless maintains a record of the source of each component of the text.

The word processor 210 is also functional for allowing the user to identify a section of text and to request alternatives for that selection. If the text selection is derived from one or more stochastic input sources, there will be alternatives for the text selection. The word processor 210 can request a candidate list of alternatives from the stochastic input interface 139 by providing it with the text selection and the sources of each of the components of that text selection. After the request is processed, the stochastic input interface 139 provides the word processor 210 with a candidate list for the entire text selection. The word processor 210 provides the candidate list to the user through a graphical user interface. If the user chooses one of the alternatives for the text selection from the candidate list, then the word processor replaces the text selection with the chosen candidate.

In order to process the request for a candidate list of alternatives for a text selection, the stochastic input interface 139 transmits the request to the stochastic input combiner 137. By communicating with the stochastic input sources through the stochastic input interface 139, the stochastic input combiner 137 can retrieve information about the stochastic models 270 needed to produce the candidate list for the text selection.

To produce the candidate list, the stochastic input combiner 137 may optionally consult a natural language model 220. To do so, the combiner 137 first produces an interim candidate list of alternatives for the text selection using the information retrieved from the stochastic models 270. After the combiner 137 provides the interim candidate list to the natural language model 220, the natural language model analyzes the interim candidate list using clues such as grammar, the overall meaning of a section of text, and the probability of various word sequences. Based upon this analysis, the natural language model 220 produces additional alternatives for the candidate list and reevaluates the probabilities of those alternatives in the interim candidate list.

As shown in FIG. 2, stochastic input sources 230, 240, and 250 can each provide stochastic data to word processor 210 without first filtering their stochastic data through another stochastic input source. In other words, stochastic input sources 230, 240, and 250 can each directly (through stochastic input interface 139) transmit stochastic data to the word processor 210, and stochastic data from each source can be incorporated into the same word processing document. For this reason, they are "parallel stochastic input sources" 296, and these stochastic input sources may be described as configured "in parallel."

Although the various program modules have been described separately, one skilled in the art should recognize that the modules could be combined in various ways and that new program modules could be created to accomplish similar results. In particular, the stochastic input combiner 137 and the natural language model 220 could reside in the stochastic input interface 139, and all three program modules could be part of the operating system 135 or the word processor 210. Also, the combiner 137 and the natural language model 220 could be separate programs that interface with the word processor 210 directly. Similarly, the stochastic input sources 230, 240, 250, and 260 could be stand-alone application program modules 138, or they could be part of the operating system 135.

Exemplary User Interfaces

Figure 3:
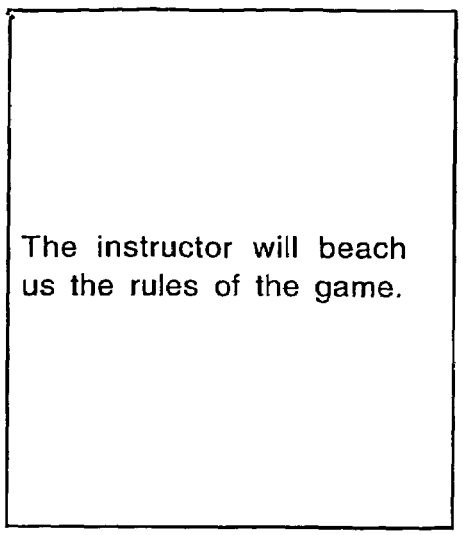
FIGS. 3, 4, 5, 6, and 6*b* depict illustrative computer program screen shots according to an exemplary embodiment of the present invention.
Figure 4:
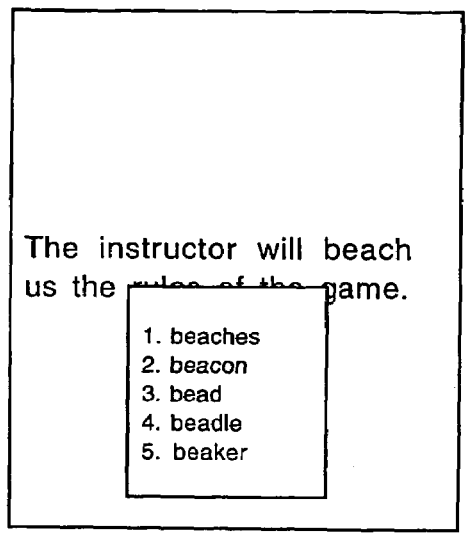

Referring to FIGS. 3–6b, an exemplary embodiment of the present invention presents to the user a user interface that opens directly into the document being edited. As shown in FIG. 3, for example, the user inputs a sentence into a conventional word processing program 210 document using a stochastic input method such as a speech recognition program module 260, and the system incorrectly displays the word "beach" instead of the desired word "teach". As shown in FIG. 4, after the user identifies the incorrectly displayed word, and selects the correction function, a user interface pops up directly into the document being edited and displays a list of candidate alternative words. The list of candidate words closely approximate the selected word, i.e., the list of candidate words or words with similar spelling to the incorrectly displayed word "beach".

Figure 5:
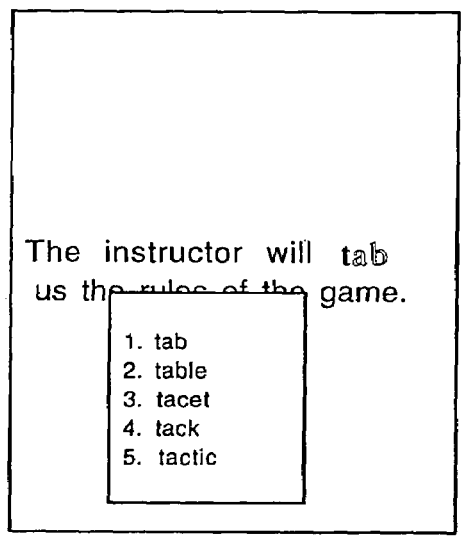
Figure 6:
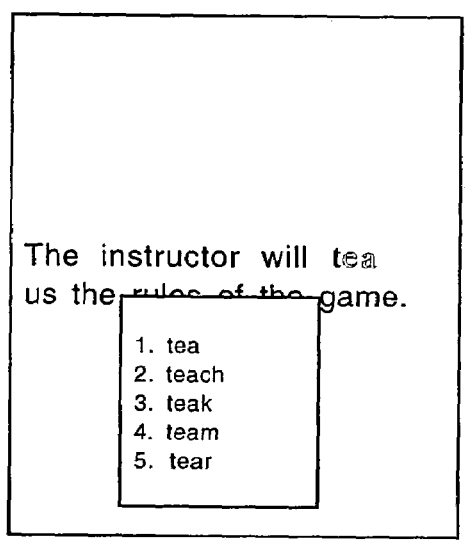

As shown in FIG. 5, after the user commences typing the correct word "teach" directly into the document, the list of candidates displayed by the user interface 410 is dynamically changed to provide words whose spelling follows from the character being input by the user. With each new character entered by the user, the list of candidate words is filtered to present only those words whose spelling follow from the combination of characters now input by the user, as illustrated in FIG. 6. As briefly described above, once the user selects a desired word from the candidate list, or if the user selects a word suggested by the autocomplete tip functionality, the user interface 410 closes without the need for additional action by the user.

Autocomplete Tip Functionality

As briefly described above, in a preferred embodiment of the present invention, during editing of an incorrectly displayed word or data, the user may be presented with the most likely alternative word to match the word or data desired by the user. For example, referring to FIG. 5, after the user has typed or dictated the letter "t" to begin entering the desired word "teach" to replace the incorrectly presented word "beach", the autocomplete tip functionality, if selected by the user, will search the candidate list of alternative words or data, and will present to the user directly into the document the suggested alternative. In an exemplary embodiment of the autocomplete tip functionality the suggested alternative word is presented such that the character entered by the user is shown in standard video and the remaining characters of the suggested word are shown in reverse video directly into the document being edited.

For example, referring to FIG. 5, after the user has typed or dictated the character "t" to begin entering the word "teach" in place of the incorrectly displayed word "beach", the system dynamically changes the user interface 410 to offer words with spelling that follow from the characters being entered by the user. In the example illustrated in FIG. 5, after the user has typed or dictated the letter "t", the user interface 410 displays, among other things, the word "tab". In accordance with the present invention, the autocomplete tip functionality, if selected by the user, will search the list of candidate words and suggest to the user the most likely candidate. In the example shown in FIG. 5, the autocomplete tip functionality suggests to the user that the word "tab" is the most likely candidate. The suggestion is presented to the user by presenting the word "tab" directly into the document with the letter "t" in standard video and the letters "a" and "b" in reverse video. If the word "tab" is the correct word, the user may accept the autocomplete tip, and the user interface 410 will close, and the user may continue with inputting words or data.

Figure 7:
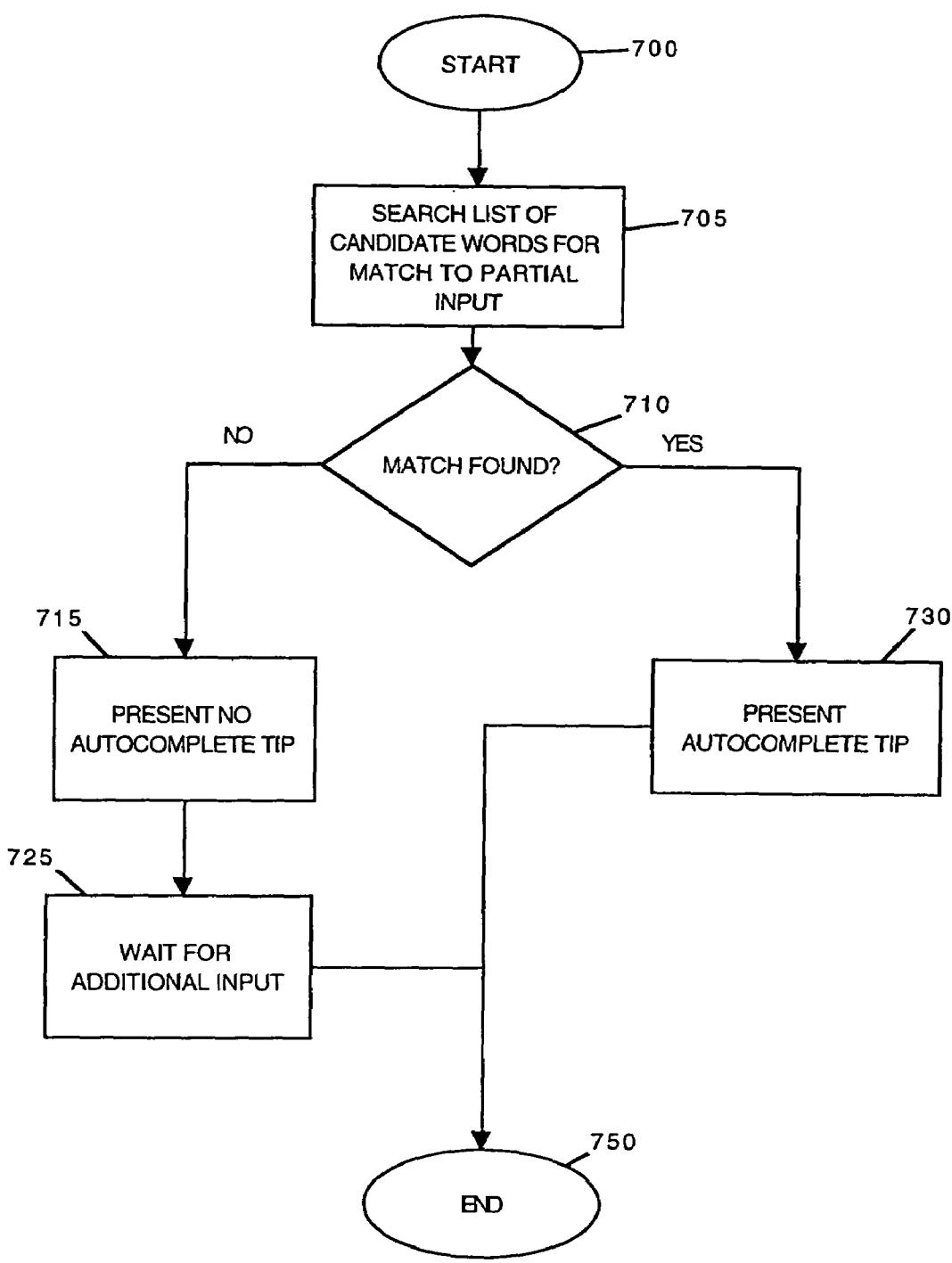
FIG. 7 is a flow diagram illustrating the preferred steps for presenting an autocomplete tip to the user during text editing.

FIG. 7 is a flow diagram illustrating exemplary steps for presenting an autocomplete tip to the user during text editing. After starting at step 700, the autocomplete tip functionality method proceeds to step 705 where a list of candidate words matching the partial entry entered by the user is searched. At step 710 a determination is made as to whether a match for the desired word is found. If no match for the desired word is found, the method proceeds to step 715, and no autocomplete tip is presented. That is, if a search of the list of candidate words presented in the user interface 410, shown in FIG. 5, fails to identify any word which follows from the characters being entered by the user, then no autocomplete tip functionality word will be offered to the user into the text of the document, as shown in FIG. 5. If at step 715 no autocomplete tip functionality is presented, the method proceeds to step 725 and waits for additional character or data input by the user.

If at step 710, a word is located in the list of candidate words whose spelling matches the characters or data being input by the user, the method proceeds to step 730, and an autocomplete tip is presented to the user in the form of the matching word or data. It should be understood that with each additional character input by the user input into the document, the method thus described is followed to locate a word or data that may be suggested to the user as the most likely alternative to the incorrectly displayed word or data. The logic used by the autocomplete tip functionality for searching for the most likely alternative word or data on the list of candidate words or data is described in detail in U.S. Pat. No. 5,845,300 assigned to the same assignee as the present invention, and is hereby incorporated by reference.

Operation of a Typical Implementation

Figure 8:
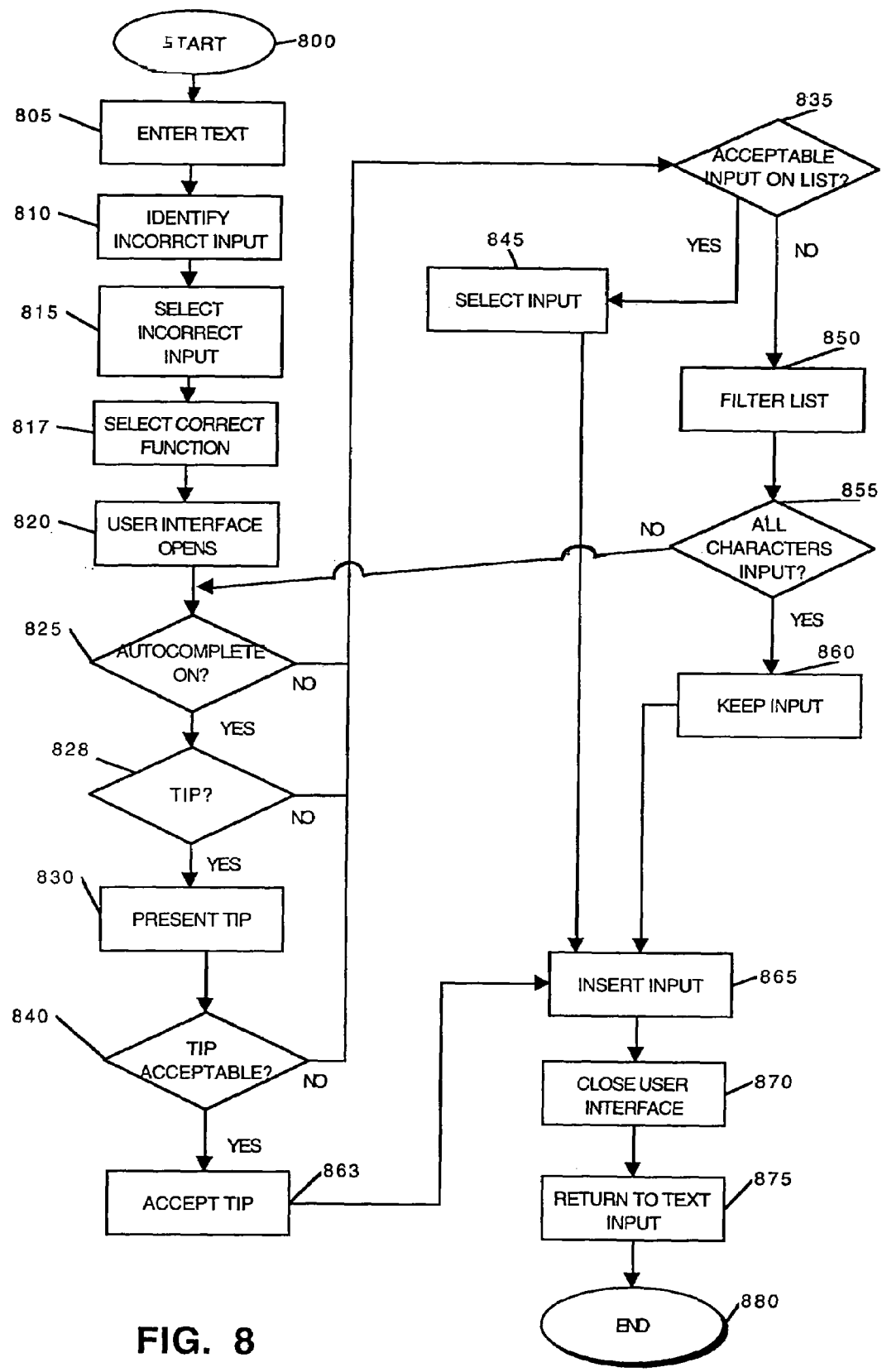
FIG. 8 is a flow diagram illustrating the preferred steps for correcting input from stochastic input methods incorporating autocomplete tip functionality.

It is advantageous to describe the preferred embodiment of the present invention in terms of the handling of text input by a stochastic input method such as a speech recognition program module 260, implemented via a speech dictation unit. FIG. 8 is a flow diagram illustrating the preferred steps for correcting input from stochastic input methods incorporating autocomplete tip functionality. For purposes of this description, the steps shown in FIG. 8 will be described with reference to the illustrative computer program screen shots shown in FIGS. 3–6b.

The method begins at step 800 and proceeds to step 805 where the user enters text using a conventional word processing computer program 210 in combination with a speech dictation unit. As the user dictates text, the text is presented in the document 405 displayed on the screen of the user's computer monitor 147 as shown in FIG. 3. For purposes of the present example, and as shown in FIG. 3, the user dictates the sentence "the instructor will teach us the rules of the game." However, as shown in FIG. 3, the speech recognition program module 260 translates the word "teach" as the word "beach" and displays the word "beach" in the document 405 being created by the user.

At step 810, the user identifies the incorrectly displayed word "beach". At step 815, the user selects the incorrect word "beach" by placing the cursor 315 of the user's word processing program inside the word "beach" 310. After placing the cursor 315 inside the incorrectly displayed word, the method proceeds to step 817, and the user selects the correction button or correction function key utilized by the user's word processing software program 210 to initiate the functionality of the present invention.

Referring now to FIG. 4, after the user selects the correction function at step 817, the method moves to step 820, and the user interface 410 opens inside the document 405 being prepared by the user. As shown in FIG. 4, the user interface 410, opened inside the document 405, initially presents a candidate list of alternative words to the word selected by the user. In the example illustrated in FIG. 4, the user interface presents the word "beaches," "beacon," "bead," "beadle," and "beaker."

At step 825, a determination is made as to whether the autocomplete tip functionality is selected by the user. The method proceeds to step 825, and a determination is made as to whether any of the words contained on the list of candidate words presented via the user interface 410 are the most likely alternative words desired by the user. The logic employed to determine whether an autocomplete tip should be presented to the user is described in detail above. If at step 825, a determination is made that an autocomplete tip should be presented to the user, the method proceeds to step 830 and the autocomplete tip functionality is presented to the user. In the present example, and referring to FIG. 4, if the autocomplete tip functionality suggests the word "beaches" as the most likely alternative to the word "beach," that word will be displayed to the user inside the document in reverse video presentation.

At step 840, a determination is made as to whether the suggested word is acceptable. In the present example, the word desired by the user is the word "teach" instead of the incorrectly displayed word "beach". Accordingly, at step 840, the determination is made that the suggested word "beaches" is not an acceptable alternative to the word "beach". As should be understood, whether or not the suggested word is acceptable is a determination made by the user. If the word "beaches," in the present example, is acceptable to the user, the method proceeds to step 863, where the user accepts the tip suggested by the autocomplete tip functionality. The method then proceeds to step 865, and the accepted word is inserted directly into the document. The method then proceeds to step 870 and the user interface 410 is closed. Finally, the method proceeds to step 875 where the user is allowed to return to entering text.

In the present example, at step 840, the determination is made that the word "beaches" is not an acceptable alternative to the word "beach," and the method proceeds to step 835. At step 835, a determination is made as to whether the user interface candidate list contains an acceptable word. It should be understood, that if at step 825 the autocomplete tip functionality had not been selected by the user, the method would have proceeded directly from step 820 to step 835.

Referring to FIG. 4, at step 835 the user looks at the list of candidate words offered by the user interface 410 and determines that the desired word "teach" is not on the list. It should be understood, that the candidate list may contain many more words than the five words illustrated in FIG. 4 and that the total list of those words may exceed the space within the user interface 410 for display to the user. Advantageously, the filtering aspect of the present invention, discussed below, allows the user to filter the list provided by the user interface 410 without the need for entering the user interface 410 to browse the total list of candidate words.

If at step 835 the user determines that a word contained in the candidate is an acceptable alternative to the incorrectly presented word "beach," the method proceeds to step 845, and the user selects the correct word. For example, referring to FIG. 4, if the user determines that the word "beacon" is a correct alternative to the incorrectly presented word "beach," the user may simply select the word "beacon" by typing the number "2" in this example. If the user selects a word from the candidate list, the method proceeds to step 865, and the selected word is inserted directly into the document. The method would then proceed to close the user interface and return to text input as described previously.

Following the present example, as illustrated in FIGS. 3–6b, at step 835 the user interface does not contain an acceptable alternative for the incorrectly presented word "beach." That is, the user desired that the word "teach" be input into the document, and that word is not displayed on the list of candidate words displayed via the user interface 410. Accordingly, the method moves from step 835 to step 850 where the list of candidate words is filtered.

Referring to FIG. 5, the user initiates filtering of unwanted words from the candidate list presented by the user interface 410 by beginning input directly into the text of the document characters that properly spell or comprise the word or data desired by the user. Following with the present example, and referring to FIG. 5, the user types or spells out, in the case of the speech dictation unit, the letter "t". As soon as the letter "t" is entered by the user, the list of candidate words presented by the user interface 410 is dynamically changed to provide a list of words whose spelling follow from the input of the user.

As shown in FIG. 5, the list of candidate words presented by the user interface 410 is changed to present the words "tab," "table," "tacet," "tack" and "tactic." It should be understood to those skilled in the art that the list of candidate words may be drawn from any suitable source such as a spell checking dictionary contained within the word processing program utilized by the user, or from any other suitable dictionary source including remote dictionary sources consulted by the user's word processing program via the Internet or Intranet.

After the user enters the first character, in this case the letter "t", the method proceeds to step 855, and a determination is made as to whether the user has entered all characters of the desired word or data without locating an acceptable word on a list of candidate words and without accepting a word provided by the autocomplete tip functionality. If the user has entered enough characters such that no additional filtering of the candidate list is possible, and the user has not accepted an alternative provided in the candidate list, the characters input by the user will be accepted as the desired word at step 860.

The method then will proceed to step 865 where that text will be inserted into the document and the user interface will be closed as described above. It should be understood, that such an event may occur when the user desires a word that is not found on the list of candidate words taken from the dictionary source utilized by the method and system of the present invention. For example, if the user types a word that is a term of art and is not a regularly accepted word in any dictionary source utilized by the method and system of the present invention, the desired word will not appear on the candidate list, and will not be presented by the autocomplete tip functionality. This aspect of the present invention is advantageous because the user is allowed to type or spell in order the filter the candidate list, but the user is allowed to input the characters directly into the document. After the user determines that the correct word is not found in the candidate list, the word being input by the user during the editing process may be accepted without losing the characters being input by the user during the editing process.

If the user has entered an additional character at step 850 to filter the list of candidate words, and if at step 855 the user has not entered a sufficient set of characters to comprise the desired word, the method moves back to step 825 where a determination is made as to whether the autocomplete tip functionality is on. As discussed above, if the autocomplete tip functionality is on at step 825 a determination is made whether to present the user with an autocomplete tip at step 828. Referring to FIG. 5 in the present example, if the autocomplete tip functionality is on, the method according to the present invention may suggest the word "tab" from the list of candidate words as the most likely alternative to the word "beach" after the user typed the initial character "t". At step 830 the word "tab" is presented to the user as shown in FIG. 5 with the letter "t" in standard video and the letters "a" and "b" in reverse video. If the word "tab" is acceptable at step 840, the user accepts the word "tab" at step 863, and at step 865 the word "tab" is inserted into the text and, the user interface is closed as described above.

If at step 825 the autocomplete tip functionality is not on, or if the word presented by the autocomplete tip functionality is not acceptable, the method moves to step 835 where a determination is made as to whether any words on the candidate list are acceptable as alternatives to the incorrectly presented words "beach". If any of the words presented such as "tab", "table" or "tactic" are acceptable to the user, the user may select one of those words for entry into the document as described above. However, if at step 835 no acceptable word has been presented by either the autocomplete tip functionality or on the list of candidates for selection by the user, the method moves once again to step 850 where the list of candidates is filtered by the input of an additional character by the user.

Referring to FIG. 6, the user types the character "e" or spells the character "e", in the case of a speech dictation unit, and the list of candidates provided by the user interface 410 is dynamically changed to include a list of candidates whose spelling follows from the two characters "t" and "e" entered by the user. As shown in FIG. 6, the list of candidates provided via the user interface 410, according to the present example, includes the words "tea," "teach," "teak," "team," and "tear".

At step 855, a determination is made as to whether the user has now entered all the characters necessary to complete the desired word without locating the desired word on the list of candidates and without being presented the desired word by the autocomplete tip functionality. In the present example, where the user has entered only the letters "t" and "e", the desired word has not been reached. Accordingly, the method moves back to step 825 where a determination is made as to whether the autocomplete tip functionality is on. If the autocomplete tip functionality is on, a determination will be made at step 828 as to whether an autocomplete tip functionality may be presented to the user. In accordance with the present example, and as shown in FIG. 6, an autocomplete tip of the word "tea" may be presented to the user where the letters "t" and "e" are shown in standard video and the letter "a" is shown in reverse video. As discussed previously, if the word "tea" is acceptable to the user as a correct word, the user can accept the word and that word will be inserted directly into the document. In the present case, however, the word "tea" is not the desired word, and the method moves to step 835.

Figure 6B:
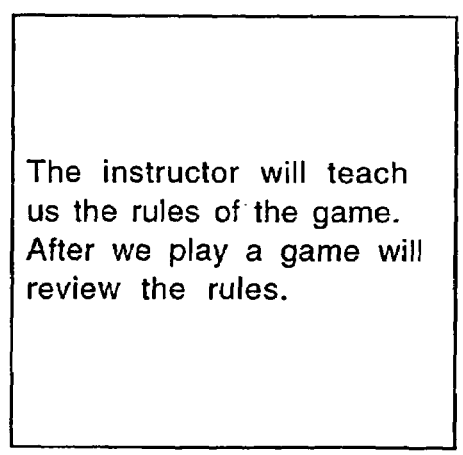

At step 835, a determination is made whether the candidate list contains the acceptable word. As shown in FIG. 6, the desired word "teach" is now displayed via the user interface 410 as choice number two (2). Accordingly, the method moves to step 845 where the user selects the word "teach" as choice number two (2) and the word "teach" is inserted directly into the text of the document as shown in FIG. 6b. At step 870, the user interface 410 is closed, and at step 875 the user returns to input of text.

As should be readily understood from the foregoing discussion, if the user does not select the word "teach" from the candidate list at step 845, the method would proceed to step 850 where the user would continue to filter the list by typing the next letter, in this case "a" in the user's effort to type or spell out the word "teach". This would be the case, for example, where the candidate list provided via the user interface 410, as illustrated in FIG. 6 had contained enough words such that the word "teach" is on the list, but is not displayed via the user interface 410. After the user types an additional character "c" at step 850, the list will be filtered once again, and all words not beginning with "tec" will be filtered out. Accordingly, following from the example illustrated in FIG. 6, the word "teach" may be filtered into the visual display of candidates displayed via the user interface 410. Then, when the method moves back to step 825, if the autocomplete tip functionality is on, the word "teach" may be suggested to the user as the most likely candidate to replace the incorrectly displayed word "beach". At that time, the user may accept the word "teach" as the correct alternative. Otherwise, if the autocomplete tip functionality is not on, the user may simply select the word "teach" from the list of candidate words provided via the user interface 410 as described above.

As described herein, the present invention provides for correcting input from stochastic input methods by allowing the user to select an incorrectly displayed word or data and by providing the user with a list of candidate words from which to select a desired alternative. The user does not need to interact with the user interface 410 by placing the cursor 315 inside the user interface or by typing inside the user interface in order to filter the list of alternative words or data provide via the user interface.

Other alternative embodiments will become apparent to those skilled in the art to which an exemplary embodiment pertains without departing from its spirit and scope. Accordingly, the scope of the present invention is defined by the appended claims.

The invention claimed is:

1. A method for correcting text input into a text document, comprising the steps of:
   receiving a text selection input into the text document from at least one source comprising one of the following: stochastic and non-stochastic, the text selection comprising two or more text components;
   receiving a selection of an erroneous text component from the two or more text components of the text selection;
   receiving a command to display a list of alternatives to the erroneous text component;
   in response to receiving the command to display the list of alternatives to the erroneous text component, submitting the erroneous text component to a correction scope model to determine if a scope of correction should be adjusted, wherein the correction scope model uses at least a natural language model and an input methods model in determining the scope of correction;
   if the correction scope model determines the scope of correction should be adjusted, then receiving from the correction scope model a text unit that includes the erroneous text component and at least one text component from the text selection adjacent the erroneous text component;

displaying a list of alternatives to the text unit via a user interface opened directly into the text document;

after displaying the list of alternatives to the text unit, automatically displaying, directly in the text document, a suggested alternative to the text unit from the list of alternatives to the text unit;

determining if the displayed suggested alternative to the text unit is an acceptable alternative to the text unit;

if the displayed suggested alternative to the text unit is not the acceptable alternative to the text unit, receiving an edit in the text document, the edit comprising a partial entry of the acceptable alternative to the text unit;

filtering the list of alternatives in response to the edit to remove alternatives not associated with the partial entry;

in response to filtering the list of alternatives, displaying a revised list of alternatives containing alternatives associated with the partial entry;

if the revised list of alternatives includes the acceptable alternative to the text unit, selecting the acceptable alternative to the text unit from the revised list;

replacing, directly into the text document, the text unit with the selected acceptable alternative; and closing the user interface.

2. The method of claim 1, further comprising the steps of:

if, in response to filtering the list of alternatives, no acceptable alterative to the text unit is identified, receiving additional edits in the text document to further filter the list of alternatives in response to the additional edits; and if no acceptable alternative to the text unit is identified in response to further filtering of the list of alternatives in response to the additional edits, replacing, directly into the text document, the text unit with the entry comprised of the edit and the additional edits.

3. The method of claim 1, further comprising the steps of:

identifying a matching completed alternative text component within the revised list of alternatives containing alternatives associated with the partial entry;

displaying the matching completed alternative text component directly into the text document as a suggested completion for the partial entry;

receiving an acceptance command in association with the suggested completion; and in response to the acceptance command, replacing, directly into the text document, the text unit with the matching completed alternative text component.

4. The method of claim 1 wherein the step of receiving an edit in the text document includes typing a first character of the acceptable alternative directly into the text document at the location of the text unit.

5. The method of claim 1, whereby the stochastic input source comprises a speech recognition device.

6. The method of claim 5 wherein the step of receiving an edit in the text document includes audibly spelling, via the speech recognition device, a first character of the acceptable alternative directly into the text document at the location of the text unit.

7. The method of claim 1, whereby the stochastic input source comprises a hand writing recognition device.

8. The method of claim 7, whereby the step of receiving an edit in the text document includes hand writing, via the hand writing recognition device, a first character of the acceptable alternative directly into the text document at the location of the text unit.

9. The method of claim 1, whereby the stochastic input source comprises a vision-based recognition device for recognizing sign language or other gestures.

10. A computer-readable medium having computer-executable instructions which, when executed by a computer, perform the method of claim 1.

11. A computer system operative to perform the method of claim 1.

12. The method of claim 1, further comprising:

if the correction scope model determines the scope of correction should not be adjusted, then displaying the list of alternatives to the erroneous text component via a user interface opened directly into the text document;

after displaying the list of alternatives, receiving an edit to the erroneous text component directly into the erroneous text component in the text document, the edit comprising a partial entry of a desired alterative to the erroneous text component;

filtering the list of alternatives in response to the edit to remove alternatives not associated with the partial entry;

in response to filtering the list of alternatives, displaying a revised list of alternatives containing alternatives associated with the partial entry;

selecting an alternative to the erroneous text component from the revised list;

replacing, directly into the text document, the erroneous text component with the selected alternative; and closing the user interface.

13. The method of claim 1, wherein the suggested alternative to the text unit is displayed directly in the text document in reverse video presentation.

14. A method for correcting text input into a text document, comprising the steps of:

receiving a text selection input into the text document comprising two or more text components from at least one source comprising one of the following: stochastic and non-stochastic;

receiving a selection of an erroneous text component from the two or more text components of the text selection;

receiving a command to display a list of alternatives to the erroneous text component;

in response to receiving the command to display the list of alternatives to the erroneous text component, submitting the erroneous text component to a correction scope model to determine if a scope of correction should be adjusted, wherein the correction scope model uses at least a natural language model and an input methods model in determining the scope of correction;

if the correction scope model determines the scope of correction should be adjusted, then receiving from the correction scope model a text unit that includes the erroneous text component and at least one text component from the text selection adjacent the erroneous text component;

displaying a list of alternatives to the text unit via a user interface opened directly into the text document;

after displaying the list of alternatives to the text unit, automatically displaying, directly in the text document, a suggested alternative to the text unit from the list of alternatives to the text unit;

determining if the displayed suggested alternative to the text unit is an acceptable alternative to the text unit;

if the displayed suggested alternative to the text unit is not the acceptable alternative to the text unit, receiving an edit in the text document, the edit comprising a partial entry of the acceptable alternative to the text unit;

filtering the list of alternatives in response to the edit to remove alternatives not associated with the partial entry;

in response to filtering the list of alternatives, displaying a revised list of alternatives containing alternatives associated with the partial entry;

if, in response to filtering the list of alternatives, no acceptable alternative to the text unit is identified, receiving additional edits to the text unit directly into the text unit in the text document to further filter the list of alternatives in response to the additional edits;

after receiving each of the additional edits, displaying a further revised list of alternatives containing alternatives associated with an entry comprised of the edit and the additional edits;

if no acceptable alternative to the text unit is identified in response to further filtering of the list of alternatives in response to the additional edits, replacing, directly into the text document, the text unit with the entry comprised of the edit and the additional edits; and closing the user interface.

15. The method of claim 14 wherein the step of receiving an edit in the text document includes typing a first character of the acceptable alternative directly into the text document at the location of the text unit.

16. The method of claim 14 wherein the step of receiving an edit in the text document includes audibly spelling, via a speech recognition device, a first character of the acceptable alternative directly into the text document at the location of the text unit.

17. The method of claim 14 whereby the step of receiving an edit in the text document includes hand writing, via a hand writing recognition device, a first character of the acceptable alternative directly into the text document at the location of the text unit.

18. A computer-readable medium having computer-executable instructions which, when executed by a computer, perform the method of claim 14.

19. A computer system operative to perform the method of claim 14.

20. The method of claim 14, further comprising:

if the correction scope model determines the scope of correction should not be adjusted, then displaying the list of alternatives to the erroneous text component via a user interface opened directly into the text document;

after displaying the list of alternatives, receiving an edit to the erroneous text component directly into the erroneous text component in the text document, the edit comprising a partial entry of a desired alterative to the erroneous text component;

filtering the list of alternatives in response to the edit to remove alternatives not associated with the partial entry;

in response to filtering the list of alternatives, displaying a revised list of alternatives containing alternatives associated with the partial entry;

if, in response to filtering the list of alternatives, no acceptable alternative to the erroneous text component is identified, receiving additional edits to the erroneous text component directly into the erroneous text component in the text document to further filter the list of alternatives in response to the additional edits;

after receiving each of the additional edits, displaying a further revised list of alternatives containing alternatives associated with an entry comprised of the edit and the additional edits;

if no acceptable alternative to the erroneous text component is identified in response to further filtering of the list of alternatives in response to the additional edits, replacing, directly into the text document, the erroneous text component with the entry comprised of the edit and the additional edits; and closing the user interface.

21. A method for correcting text input into a text document, comprising the steps of:

receiving a text selection input into said text document comprising two or more text components from at least one source comprising one of the following: stochastic and non-stochastic;

receiving a selection of an erroneous text component from the two or more text components of the text selection;

receiving a command to display a list of alternatives to the erroneous text component;

in response to receiving the command to display the list of alternatives to the erroneous text component, submitting the erroneous text component to a correction scope model to determine if a scope of correction should be adjusted, wherein the correction scope model uses at least an input methods model in determining the scope of correction;

if the correction scope model determines the scope of correction should be adjusted, then receiving from the correction scope model a text unit that includes the erroneous text component and at least one text component from the text selection adjacent the erroneous text component;

displaying a list of alternatives to the text unit via a user interface opened directly into the text document;

after displaying the list of alternatives to the text unit, automatically displaying, directly in the text document, a suggested alternative to the text unit from the list of alternatives to the text unit;

determining if the displayed suggested alternative to the text unit is an acceptable alternative to the text unit;

if the displayed suggested alternative to the text unit is not the acceptable alternative to the text unit, receiving an edit to the text unit directly in the text document, the edit comprising a partial entry of the acceptable alternative to the text unit;

filtering the list of alternatives in response to the edit to remove alternatives not associated with the partial entry;

in response to filtering the list of alternatives, displaying a revised list of alternatives containing alternatives associated with the partial entry;

identifying a matching completed alternative text component within the revised list of alternatives that may be displayed as a suggested completion for the partial entry;

displaying the matching completed alternative text component directly into the text document as a suggested completion for the partial entry;

receiving an acceptance command in association with the suggested completion;

in response to the acceptance command, replacing, directly into the text document, the text unit with the matching completed alternative text component; and closing the user interface.

22. The method of claim 21, further comprising the steps of:
- if no matching completed alternative text component is identified, receiving additional edits in the text document to further filter the revised list of alternatives in response to the additional edits;
- after receiving each of the additional edits, displaying a further revised list of alternatives containing alternatives associated with an entry comprised of the edit and the additional edits;
- if no matching completed alternative text component that may be displayed as a suggested completion of the entry comprised of the edit and the additional edits is identified in response to further filtering of the revised list of alternatives in response to the additional edits, then accepting the partial entry comprised of the edit and the additional edits as a substitute for the text unit; and
- entering the entry comprised of the edit and the additional edits as a substitute for the text unit.

23. The method of claim 21 wherein the step of receiving an edit in the text document includes typing a first character of the acceptable alternative directly into the text document at the location of the text unit.

24. The method of claim 21 wherein the step of receiving an edit in the text document includes audibly spelling, via a speech recognition device, a first character of the acceptable alternative directly into the text document at the location of the text unit.

25. The method of claim 21 whereby the step of receiving an edit in the text document includes hand writing, via a hand writing recognition device, a first character of the acceptable alternative directly into the text document at the location of the text unit.

26. A computer-readable medium having computer-executable instructions, which when executed by a computer, perform the method of claim 21.

27. A computer system operative to perform the method of claim 21.

28. The method of claim 21, further comprising:
- if the correction scope model determines the scope of correction should not be adjusted, then displaying the list of alternatives to the erroneous text component via a user interface opened directly into the text document;
- after displaying the list of alternatives, receiving an edit to the erroneous text component directly into the erroneous text component in the text document, the edit comprising a partial entry of a desired alterative to the erroneous text component;
- filtering the list of alternatives in response to the edit to remove alternatives not associated with the partial entry;
- in response to filtering the list of alternatives, displaying a revised list of alternatives containing alternatives associated with the partial entry;
- identifying a matching completed alternative text component within the revised list of alternatives that may be displayed as a suggested completion for the partial entry;
- displaying the matching completed alternative text component directly into the text document as a suggested completion for the partial entry;
- receiving an acceptance command in association with the suggested completion;
- in response to the acceptance command, replacing, directly into the text document, the erroneous text component with the matching completed alternative text component; and
- closing the user interface.

* * * * *